United States Patent Office 3,658,930
Patented Apr. 25, 1972

3,658,930
OLEFIN CONVERSION WITH HETEROGENEOUS OLEFIN DISPROPORTIONATION CATALYST COMBINED WITH RHODIUM OXIDE
Joseph R. Kenton and John E. Mahan, Bartlesville, Okla., assignors to Phillips Petroleum Company
No Drawing. Filed Dec. 20, 1968, Ser. No. 785,771
Int. Cl. C07c *3/62, 11/00, 13/00*
U.S. Cl. 260—683 D        9 Claims

ABSTRACT OF THE DISCLOSURE

Olefins are converted in accordance with the olefin reaction by contacting the olefin feed with a catalyst which comprises a heterogeneous olefin reaction catalyst in association with rhodium oxide.

FIELD OF THE INVENTION

This invention relates to the conversion of olefin hydrocarbons in accordance with the olefin reaction. This invention also relates to the conversion of olefin hydrocarbons in accordance with the olefin reaction in the presence of a heterogeneous catalyst system. In another aspect, this invention relates to olefin reaction catalysts.

DESCRIPTION OF THE PRIOR ART

It has previously been known in the art that olefin hydrocarbons can be converted in accordance with the olefin reaction, as hereinafter defined, by contacting the feed olefin with a heterogeneous olefin reaction catalyst. For example, U.S. Pat. 3,261,879, R. L. Banks, issued July 19, 1966, discloses a suitable heterogeneous olefin disproportionation catalyst for the conversion of olefins. Additionally, U.S. Pat. 3,365,513, L. F. Heckelsberg, issued Jan. 23, 1968, discloses another heterogeneous olefin reaction catalyst which is capable of disproportionating olefins. The examples of the two above-mentioned patents contain numerous illustrations of the distribution of products which are produced when a suitable feed olefin is brought into contact with the catalysts of Banks and Heckelsberg. It has recently been found that when utilizing the olefin reaction to produce higher molecular weight olefins from lower molecular weight feedstocks in which a number of disproportionation stages are used in succession, it is frequently desirable to broaden the molecular weight distribution of the olefin reaction products.

OBJECTS OF THE INVENTION

Accordingly, it is an object of this invention to provide a catalyst system for the conversion of olefins in accordance with the olefin reaction. It is another object of this invention to provide a catalyst system for the conversion of olefins in accordance with the olefin reaction which will rapidly convert olefins or a mixture of olefins into a broad range of other olefin products. Other objects and advantages of the present invention will become readily apparent to one skilled in the art from a careful reading of the specification and the claims.

SUMMARY OF THE INVENTION

In accordance with the invention a catalyst is provided having activity for the conversion of olefins in accordance with the olefin reaction which comprises a heterogeneous olefin reaction catalyst in combination with rhodium oxide. Further in accordance with the invention, the catalyst of the invention comprises a heterogeneous olefin reaction catalyst which is further promoted with rhodium oxide. Further in accordance with the invention, the catalyst of the invention comprises an olefin reaction catalyst which is mixed with a suitably supported rhodium oxide. Further in accordance with the invention, the catalyst of the invention comprises a heterogeneous olefin reaction catalyst comprising alumina promoted with molybdenum oxide which is also promoted with rhodium oxide, or silica promoted with tungsten oxide which is also promoted with rhodium oxide. Further according to the invention, a catalyst is provided which comprises alumina-supported rhodium oxide or silica-supported rhodium oxide which is admixed with any heterogeneous olefin reaction catalyst. Further in accordance with the invention, the catalyst comprises alumina-supported rhodium oxide or silica-supported rhodium oxide which is physically admixed with alumina-supported molybdenum oxide or tungsten silica-supported oxides. The invention also comprises a method of converting olefins in accordance with the olefin reaction by contacting a suitable feed olefin with the above-mentioned catalysts of our invention.

DESCRIPTION OF THE PREFERRED EMBODIMENTS

The olefin reaction

The olefin reaction is defined as a process for the catalytic conversion over a catalyst of a feed comprising one or more ethylenically unsaturated compounds to produce a resulting product which contains at least ten percent by weight of product compounds, which product compounds can be visualized as resulting from at least one primary reaction, as defined below, or the combination of at least one primary reaction and at least one unsaturated bond isomerization reaction, and wherein the sum of the compounds contained in said resulting product consisting of hydrogen, saturated hydrocarbons, and compounds which can be visualized as formed by skeletal isomerization, but which cannot be visualized as formed by one or more of the above-noted reactions, comprises less than twenty-five percent by weight of the total of said resulting product. Feed components and unsaturated bond isomers thereof are not included in the resulting product for the purpose of determining the above-noted percentages.

In the olefin reaction, as defined above, the primary reaction is a reaction which can be visualized as comprising the breaking of two existing unsaturated bonds between first and second carbon atoms and between third and fourth carbon atoms, respectively, and the formation of two new unsaturated bonds between said first and third and between said second and fourth carbon atoms. Said first and second carbon atoms and said third and fourth carbon atoms can be in the same or different molecules.

The olefin reaction according to this invention is illustrated by the following reactions:

(1) The disproportionation of an acyclic mono- or polyene having at least three carbon atoms into other acyclic mono- or polyenes of both higher and lower number of carbon atoms; for example, the disproportionation of propylene yields ethylene and butenes; the disproportionation of 1,5-hexadiene yields ethylene and 1,5,9-decatriene;

(2) The conversion of an acyclic mono- or polyene having three or more carbon atoms and a different acyclic mono- or polyene having three or more carbon atoms to produce different acyclic olefins; for example, the conversion of propylene and isobutylene yields ethylene and isopentene;

(3) The conversion of ethylene and an internal acyclic mono- or polyene having four or more carbon atoms to produce other olefins having a lower number of carbon atoms than that of the acyclic mono- or polyenes; for example, the conversion of ethylene and 4-methylpentene-2 yields 3-methylbutene-1 and propylene;

(4) The conversion of ethylene or an acyclic mono- or polyene having three or more carbon atoms and a cyclic mono- or cyclic polyene to produce an acyclic polyene having a higher number of carbon atoms than that of any of the starting materials; for example, the conversion of cyclohexene and 2-butene yields 2,8-decadiene; the conversion of 1,5-cyclooctadiene and ethylene yields 1,5,9-decatriene;

(5) The conversion of one or more cyclic mono- or cyclic polyenes to produce a cyclic polyene having a higher number of carbon atoms than any of the starting materials; for example, the conversion of cyclopentene yields 1,6- cyclodecadiene and continued reaction can produce higher molecular weight materials;

(6) The conversion of an acyclic polyene having at least seven carbon atoms and having at least five carbon atoms between any two double bonds to produce acyclic and cyclic mono- and polyenes having a lower number of carbon atoms than that of the feed; for example, the conversion of 1,7-octadiene yields cyclohexene and ethylene; or (7) The conversion of one or more acyclic polyenes having at least three carbon atoms between any two double bonds to produce acyclic and cyclic mono- and polyenes generally having both a higher and lower number of carbon atoms than that of the feed material; for example, the conversion of 1,4-pentadiene yields 1,4-cyclohexadiene and ethylene.

The olefin feed

Olefins applicable for use in the process of the invention include acyclic mono- and polyenes having at least three carbon atoms per molecule and cycloalkyl and aryl derivatives thereof; cyclic mono- and polyenes having at least four carbon atoms per molecule and alkyl and aryl derivatives thereof; mixtures of two or more of the above olefins; and mixtures of ethylene with one or more of the above olefins. Many useful reactions are accomplished with such acyclic olefins having 3–30 carbon atoms per molecule and with such cyclic olefins having 4–30 carbon atoms per molecule.

Some specific examples of acyclic olefins suitable for reactions of this invention include propylene, 1-butene, isobutene, 2-butene, 1,3-butadiene, 1-pentene, 2-pentene, isoprene, 1-hexene, 1,4-hexadiene, 2-heptene, 1-octene, 2,5-octadiene, 2,4,6-octatriene, 2-nonene, 1-dodecene, 2-tetradecene, 1-hexadecene, 5,6-dimethyl-2,4-octadiene, 2-methyl-1-butene, 2-methyl-2-butene, 1,3-dodecadiene, 1,3,6-dodecatriene, 3-methyl-1-butene, 1-phenylbutene-2, 7,7-diethyl-1,3,5-decatriene, 1,3,5,7,9 - octadecapentaene, 1,3-eicosadiene, 4-octene, 3-eicosene and 3-heptene, and the like, and mixtures thereof.

Some specific examples of cyclic olefins suitable for the reactions of this invention are cyclobutene, cyclopentene, cyclohexene, 3-methylcyclopentene, 4-ethylcyclohexene, 4-benzylcyclohexene, cyclooctene, 5-n-propylcyclooctene, cyclodecene, cyclododecene, 3,3,5,5-tetramethylcyclononene, 3,4,5,6,7-pentaethylcyclodecene, 1,5-cyclooctadiene, 1,5,9-cyclododecatriene, 1,4,7,10-cyclododecatetraene, 2-methyl-6-ethylcyclooctadiene-1,4- and the like, and mixtures thereof.

The catalyst

The heterogeneous olefins reaction catalysts which are suitable for admixture or copromotion with rhodium oxide are any of those which show activity for disproportionating acyclic olefins having 3 or more carbon atoms into other olefins of both higher and lower molecular weight. Some examples of such catalysts are those which comprise or are prepared from such materials as oxides of molybdenum, tungsten, and rhenium, and hexacarbonyls and sulfides of tungsten and molybdenum. These catalytic promoters are generally associated with catalytic support materials such as silica, alumina, silica-alumina, magnesia-titania, zirconia, thoria, aluminum phosphate and zirconium phosphate. The catalytic agents are the reaction products resulting from the admixture, under activating conditions, of such promoter materials and such support materials. Other inert materials can also be present in the catalyst composition in minor amounts. In addition, the catalyst can contain minor amounts of some materials which, in some instances, exert a beneficial effect on the process. Such materials can include cobalt oxide and alkaline substances such as compounds of the alkali and alkaline earth metals.

Preferably, the promoter materials and support materials which are admixed to produce the heterogeneous olefin reaction catalyst are as follows:

(1) Silica or thoria promoted by an oxide, or a compound convertible to the oxide by calcination, of tungsten, molybdenum, rhenium, tellurium, or by a sulfide of tungsten or molybdenum;

(2) Alumina promoted by an oxide, or compound convertible to an oxide by calcination, of molybdenum, tungsten, or rhenium; by a sulfide of tungsten or molybdenum; or by an alkali metal salt, ammonium salt, alkaline earth metal salt, or bismuth salt of phosphomolybdic acid;

(3) One or more the group aluminum phosphate, zirconium phosphate, calcium phosphate, magnesium phosphate, or titanium phosphate promoted by one or more of a sulfide of molybdenum or tungsten, or by an oxide or a compound convertible to an oxide by calcination molybdenum, tungsten, or rhenium or by magnesium tungstate or by beryllium phosphotungstate; and (4) Silica, alumina, zirconia, aluminum phosphate, zirconium phosphate, calcium phosphate, magnesium phosphate, or titanium phosphate promoted by rhenium oxide or a hexacarbonyl of molybdenum, rhenium, or tungsten.

Some suitable catalysts are disclosed in U.S. Ser. No. 94,996, Banks, filed Mar. 13, 1961, now Pat. No. 3,463,-827; Ser. No. 312,209, Banks, filed Sept. 27, 1963, now Pat. No. 3,261,879, issued July 19, 1966; Ser. No. 509,-146, Heckelsberg, filed Nov. 22, 1965, now Pat. No. 3,365,513, issued Jan. 23, 1968; and Ser. No. 336,624, Heckelsberg, filed Jan. 1, 1964, now Pat. No. 3,340,322, issued Sept. 5, 1967.

It will be understood by those skilled in the art that the copromoted catalyst of the invention, i.e., the olefin reaction catalyst which is further promoted with rhodium oxide, is limited to an olefin reaction catalyst which contains an oxide promoter or a promoter compound which is convertible to an oxide by calcination. The preferred olefin reaction catalysts which are further promoted with rhodium oxide to form the catalyst of the invention are members of groups (1) and (2) of the above-mentioned combinations of promoter materials and support materials which produce the olefin reaction catalyst. The most preferred heterogeneous olefin reaction catalysts are alumina-supported molybdenum oxide and silica-supported tungsten oxide.

The catalyst of the invention in which the heterogeneous olefin reaction catalyst is further promoted with rhodium oxide can be prepared by any suitable catalyst forming technique. For example, impregnation of the support such as silica with a solution containing both a rhodium compound and a compound of the groups (1) and (2) mentioned above, is a presently preferred method of preparing our catalyst. After the catalyst is prepared, it is activated by heating at temperatures of up to about 1500° F., preferably 900 to 1100° F., for periods of 0.1 to 25 hours. For example, a catalyst comprising silica, tungsten oxide, and rhodium oxide can be activated at about 1000° F. for 5 hours in flowing air. If desired, the catalyst can be additionally treated with other gases such as nitrogen, carbon monoxide, and the like.

In general, the catalyst of the invention which comprises the heterogeneous olefin reaction catalyst which is further promoted by an oxide of rhodium will contain from 0.1 to about 30 weight percent of the olefin reaction promoter material and from about 0.1 to about 10 weight percent of the rhodium oxide based on the weight of the total catalyst.

In the embodiment of the invention wherein the oxide of rhodium is impregnated on a suitable support and admixed with a heterogeneous olefin reaction catalyst, the supported rhodium oxide can be prepared by any suitable procedure. For example, suitable support materials can be impregnated with a rhodium salt followed by calcination in flowing air. If desired, a commercially available rhodium-promoted alumina catalyst can be calcined in flowing air to convert the metallic rhodium to rhodium oxide. Support materials utilized for the rhodium oxide component can be any of those which are utilized as supports for the promoters which are combined to form the olefin reaction catalyst mixture. Preferred support materials for the rhodium oxide are either silica or alumina.

The olefin reaction catalysts which are mixed with the suitably supported rhodium oxide generally contain from about 0.1 to about 30 weight percent of the promoter material based on the total composite of the support material and promoter. The olefin reaction catalyst can be prepared and activated by conventional means. For example, a catalytic grade alumina gel can be impregnated with an aqueous solution of ammonium molybdate. Drying and calcining to temperatures of about 1100° F. complete the catalyst preparation. In a similar manner, a silica gel can be impregnated with ammonium metatungstate, dried and calcined. Tungsten sulfide can be ball-milled with thoria followed by heating in an inert gas such as nitrogen at 800–1400° F. A precalcined silica-alumina can be impregnated with a solution of molybdenum hexacarbonyl in a nonaqueous solvent such as benzene and then directly used in a liquid phase reaction. Optionally, this impregnated solid can be dried and heated at temperatures of up to 1000° F. in an inert atmosphere to form the catalyst.

The finished olefin reaction catalyst can be in the form of powder, or granules as well as in other shapes such as agglomerates, pellets, spheres, extrudates, and beads, depending upon the type of contacting technique which utilizes the catalyst.

It is sometimes desirable to base-treat the components of this catalyst system. Thus, the supported molybdenum oxide or the supported tungsten oxide, whether or not rhodium is present, can be treated, generally by impregnation, with small amounts of an inorganic base such as NaOH, KOH, LiOH, Ca(OH)$_2$, and the like. The catalyst component is contacted with the base in an amount ranging from 0.01 to 5.0, preferably 0.1 to 1.0 weight percent of the catalyst component. The base treatment precedes the activation described earlier.

The proportion of the olefin reaction catalyst to the suitably supported rhodium oxide is generally in the range of from about 0.1 to 1 to about 10 to 1 in parts by weight. The mixture of the olefin reaction catalyst and the rhodium oxide catalyst can be prepared by any suitable technique. For example, particles of the suitably supported rhodium oxide and particles of the olefin reaction catalyst can be blended either before or after activation. In another technique, the suitably supported rhodium oxide and the heterogeneous olefin reaction catalyst can be intimately associated such as by grinding, the powder then formed into other shapes such as pellets, tablets, agglomerates, extrudates, and the like.

The conditions for converting the feed olefins in accordance with the olefin reaction with the catalyst of the invention will depend upon the particular heterogeneous olefin reaction catalyst which is utilized in combination with the rhodium oxide. The temperature is usually in the range from about 0 to 1200° F. When using the catalyst of (1), the reaction temperatures are preferably in the range of about 400 to 1100° F.; when using the catalyst of (2), preferably in the range of about 150 to 500° F.; when using the catalyst of (3), preferably in the range of about 600 to 1200° F.; when using the catalyst of (4), preferably in the range of about 0 to 600° F. The conversion can be carried out in any convenient pressure up to about 2000 p.s.i.g. or higher, preferably 100–500 p.s.i.g. and at weight hourly space velocities, when continuous fixed bed operation is used, which can range from about 0.1 to about 1000 g./g./hr. The process can be carried out batchwise as well as continuously utilizing any conventional contacting techniques such as fixed bed reactors, fluidized catalyst beds, suspended catalysts systems, and the like, employing both gaseous and liquid phase operation. Inert diluents, such as saturated aliphatic materials, can be present in the reaction zone.

EXAMPLE I

Octene-1 was converted over a catalyst system which consisted of 10 ml. (5.2 g.) of a molybdenum oxide-promoted alumina (which had been treated with about 2 weight percent KOH and activated in air at 1000° F. for about four hours) mixed with 3.2 g. of a rhodium oxide-promoted alumina (prepared from an alumina catalyst, which contained 0.5 weight percent rhodium metal, by calcination of the rhodium catalyst in air at 1000° F. for four hours). The catalyst particles were in the form of 1/8 inch pellets.

The conversion was carried out batchwise using the refluxing liquid technique. Octene-1 was charged into a distillation pot upon which was mounted a 1/2-inch by 8-inch column. The above-described catalyst mixture was charged into the column as a fixed catalyst bed. The pot was heated and vapors of octene-1 were allowed to contact the fixed catalyst bed in the column and reflux back into the pot. Volatile products, up to about $C_4$ olefins, were allowed to escape from the top of the column. The reaction was continued for 0.5 hour during which time the pot temperature rose from 121° C. to about 129° C. and the olefin conversion was estimated at about 40 percent. The pot products were then analyzed.

For purposes of comparison, a similar run was carried out except that the catalyst charge contained only the molybdenum oxide-promoted alumina catalyst, the supported rhodium oxide being omitted. The pot temperature from this run also rose from 121 to about 129° C. and the conversion was also about 40 percent.

At the end of the reaction period, the contents of each pot were analyzed, by gas-liquid chromatography, and the conversion selectivity to the expected primary disproportionation product of 7-tetradecene was computed. A high selectivity of the conversion to the tetradecene product would indicate a relatively narrow distribution of products. A relatively low selectivity to tetradecene product, on the other hand, would indicate a broad distribution of olefin products which would include $C_{13}$ and other lower molecular weight olefins.

The selectivity to tetradecene in the invention run was 67.4 percent whereas the selectivity to tetradecene in the control run, wherein no rhodium oxide was present, was 81.9 percent. The remainder of the products from each of the runs were olefins up to $C_{13}$ with a small amount of heavy material.

These data illustrate that the use of rhodium oxide is effective for broadening the range of olefin products in a disproportionation reaction. A broad distribution of olefin disproportionation products is frequently desirable, particularly when a number of disproportionation stages are used in succession, in order to convert lower olefins into higher olefins such as those required for the preparation of olefins for use in making detergent alkylate materials.

Reasonable variations and modifications are possible without departing from the spirit and scope of the invention, wherein conversion of olefins is accomplished in accordance with the olefin reaction by contacting a feed olefin capable of undergoing the olefin reaction with a catalyst comprising a heterogeneous olefin reaction catalyst in combination with rhodium oxide.

We claim:

1. A process of converting an olefin in accordance with the olefin reaction, which as defined herein, can be visualized as comprising the reaction between two first pairs of carbon atoms, the two carbon atoms of each first pair being connected by an olefinic double bond, to form two new pairs of carbon atoms from the carbon atoms of said first pairs, the two carbons of each of said new pairs being connected by an olefinic double bond, which comprises contacting the olefin with a conversion catalyst comprising an olefin disportionation catalyst which is (a) silica or thoria promoted by an oxide, or a compound convertible to an oxide by calcination of tungsten, molybdenum, rhenium, or tellurium or by a sulfide of tungsten or molybdenum;

(b) alumina promoted by an oxide, or a compound convertible to an oxide by calcination of molybdenum, tungsten or rhenium, by a sulfide of tungsten or molybdenum, or by an alkali metal salt, ammonium salt, alkaline earth metal salt or metal salt of phosphomolybdic acid;

(c) one or more of the group aluminum phosphate, zirconium phosphate, calcium phosphate, magnesium phosphate, or titanium phosphate promoted by an oxide or a compound convertible to an oxide by calcination of molybdenum, tungsten or rhenium or by magnesium tungstate or by beryllium phosphotungstate; or (d) silica, alumina, aluminum phosphate, zirconium phosphate, magnesium phosphate, or titanium phosphate promoted by a hexacarbonyl of molybdenum, rhenium or tungsten, in combination with rhodium oxide in an amount sufficient to alter the distribution of olefin products which results from said olefin reaction in the absence of said rhodium oxide.

2. A method according to claim 1 wherein the olefin comprises acyclic mono- and polyenes having at least three carbon atoms per molecule and cycloalkyl and aryl derivatives thereof; cyclic mono- and polyenes having at least four carbon atoms per molecule and alkyl and aryl derivatives thereof; and mixtures of two or more of the above olefins or mixtures of ethylene with one or more of the above olefins.

3. A method according to claim 2 wherein the step of contacting the olefin with the conversion catalyst occurs at a temperature in the range of 0° to 1100° F.

4. The method of claim 1 wherein the conversion catalyst is rhodium oxide promoted on the alumina, silica, thoria, aluminum phosphate, zirconium phosphate, calcium phosphate, magnesium phosphate, or titanium phosphate of the olefin disproportionation catalyst.

5. The method of claim 4 wherein the amount of rhodium oxide promoter is 0.1 to about 10 weight percent based on the weight of the total conversion catalyst composition.

6. The method of claim 1 wherein the olefin disproportionation catalyst is (a) or (b).

7. The method of claim 1 wherein the conversion catalyst is the olefin disproportionation catalyst physically admixed with rhodium oxide supported on alumina, silica, thoria, aluminum phosphate, zirconium phosphate, calcium phosphate, magnesium phosphate or titanium phosphate.

8. The method of claim 7 wherein the conversion catalyst is an olefin disproportionation catalyst of alumina promoted by molybdenum oxide which is physically admixed with alumina promoted by rhodium oxide.

9. The method of claim 7 wherein the amount of the supported rhodium oxide admixed with the olefin disproportionation catalyst is from about 0.1:1 to about 10:1 in parts by weight.

References Cited
UNITED STATES PATENTS

| | | | |
|---|---|---|---|
| 2,880,241 | 3/1959 | Hughes | 252—472 |
| 2,933,542 | 4/1960 | Bain et al. | 260—675.5 |
| 2,946,739 | 7/1960 | Gardner et al. | 252—470 |
| 3,070,638 | 12/1962 | Voltz | 260—668 |
| 3,277,199 | 10/1966 | Poll | 260—667 |
| 3,395,196 | 7/1968 | Heckelsberg | 260—683 |
| 3,424,811 | 1/1969 | Mango | 260—680 |
| 3,445,541 | 5/1969 | Heckelsberg et al. | 260—683 |
| 3,523,965 | 8/1970 | Kober et al. | 252—470 |
| 3,536,777 | 10/1970 | Alkema et al. | 260—683 |

DELBERT E. GANTZ, Primary Examiner

C. E. SPRESSER, JR., Assistant Examiner

U.S. Cl. X.R.

252—470, 472; 260—666 A, 677 R, 680 R